United States Patent
Kristen et al.

[11] Patent Number: 6,127,751
[45] Date of Patent: Oct. 3, 2000

[54] ELECTRIC TOOL

[75] Inventors: Ferdinand Kristen, Gliching; Erwin Manschitz, Germering, both of Germany

[73] Assignee: Hilti Aktiengesellschaft, Schaan, Liechtenstein

[21] Appl. No.: 09/387,913

[22] Filed: Sep. 1, 1999

[30] Foreign Application Priority Data

Sep. 2, 1998 [DE] Germany .................. 198 39 963

[51] Int. Cl.$^7$ .................................................. H02K 7/19
[52] U.S. Cl. ........................ 310/50; 173/117; 173/122
[58] Field of Search .................. 310/50, 47; 173/117, 173/109, 122

[56] References Cited

U.S. PATENT DOCUMENTS

| | | | |
|---|---|---|---|
| 3,517,755 | 6/1970 | Badcock . | |
| 3,718,193 | 2/1973 | Wanner ..................................... | 173/117 |
| 3,926,266 | 12/1975 | Dorgnon ................................. | 173/110 |
| 4,276,941 | 7/1981 | Wanner et al. ........................ | 173/117 |
| 4,476,941 | 10/1984 | Buck et al. ............................ | 173/117 |
| 4,609,053 | 9/1986 | Ragnmark .............................. | 173/104 |
| 4,766,963 | 8/1988 | Hartwig et al. ....................... | 173/109 |
| 5,052,497 | 10/1991 | Houben et al. ....................... | 173/109 |
| 5,099,160 | 3/1992 | Strozel et al. ......................... | 310/56 |

*Primary Examiner*—Nestor Ramirez
*Assistant Examiner*—Joseph Waks
*Attorney, Agent, or Firm*—Brown & Wood, LLP

[57] ABSTRACT

An electric tool including a hammer mechanism (9), a drive motor (11) for driving the hammer mechanism (9), a gear (10) for connecting the drive motor (11) with the hammer mechanism (9), a ventilator wheel (7) provided in an end region of the drive motor (11) remote from the gear (10) and connected with an exhaust opening (8), and separate air channels (3,4) having each a suction opening (5,6) and ending at a side of the wheel (7) adjacent to the drive motor (11), with one of the air channels (3) being associated at least with the gear (10), and another of the air channels (4) being associated at least with the drive motor (11).

6 Claims, 1 Drawing Sheet

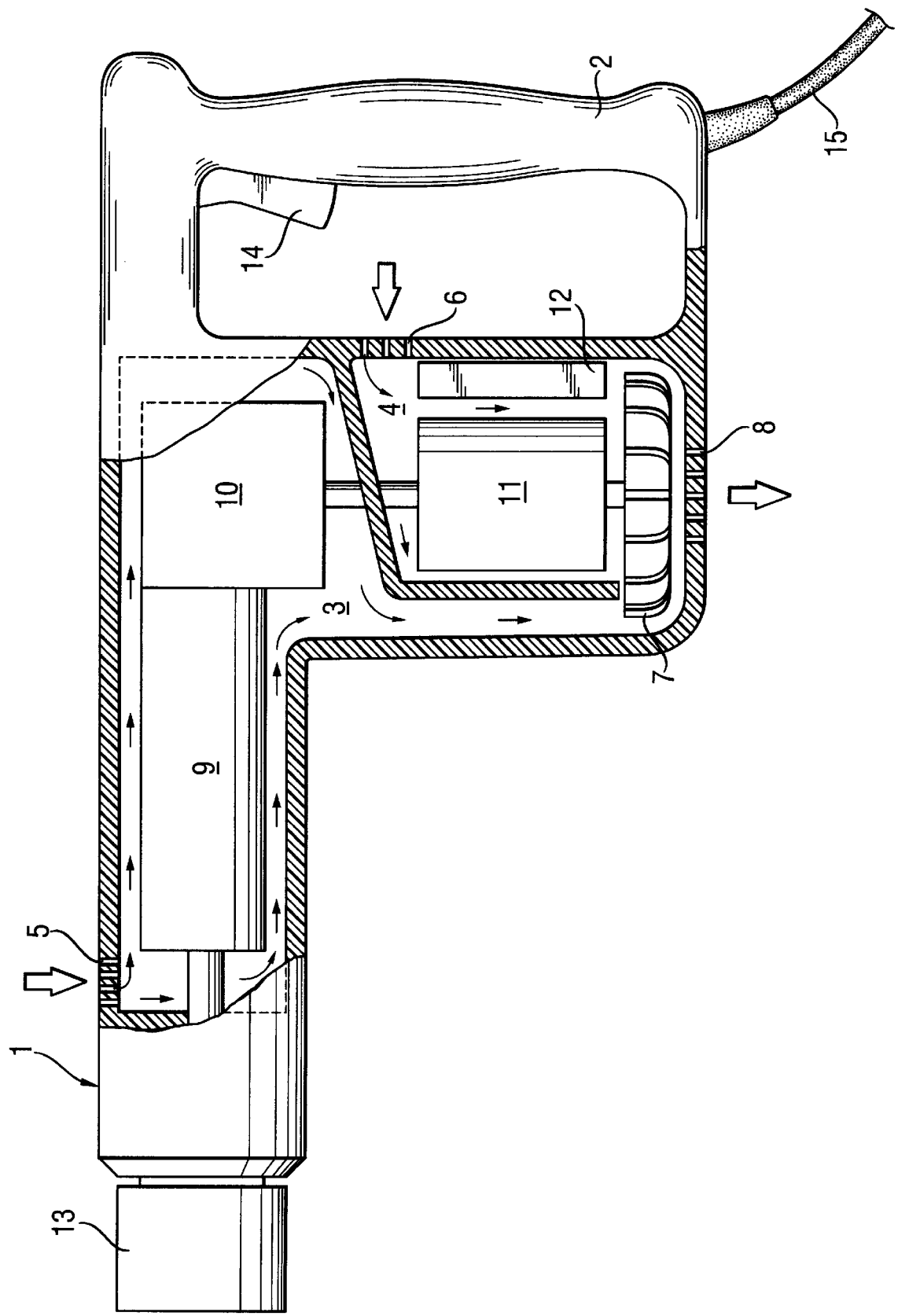

ELECTRIC TOOL

BACKGROUND OF THE INVENTION

1. Field of the Invention

The present invention relates to an electric tool, including a hammer mechanism, a drive motor for driving the hammer mechanism, a gear for connecting the drive motor with the hammer mechanism, a ventilator wheel connected with an exhaust opening, and separate air channels having each a section opening, with one of the air channels being associated at least with the gear, and another of the air channels being associated at least with the drive motor.

2. Description of the Prior Art

Because of high temperatures, which are generated in an electric tool, in particular in a drilling and chiseling tool, the electric tool is provided with a cooling device which permits to increase the service life of the drive motor and the gear which connects the drive motor with the hammer mechanism.

In a majority of electric tools, a ventilator, which serves as a cooling device, is provided on the commutator side of a rotor of the drive motor. The ventilator provides for suctioning of a cold environmental air through a suction opening formed in the tool housing, and for flow of the air past the gear and through the drive motor. The cold environmental air cools first the gear, then the drive motor and is discharged through an exhaust opening formed in the housing cover.

A drawback of this cooling device consists in that the cooling air is heated as it passes past the gear and is not capable of adequately cooling the drive motor. A further drawback of this cooling device consists in that that a large portion of the boring dust and dust particles, in particular during an overhead work, is aspirated into the drive motor through the suction opening. This significantly reduces the service life of the drive motor because the dust and drillings cause erosion of both the rotor and the stator of the drive motor.

To eliminate this drawback, German publication DE-196 00 339 proposes an electric tool in which the gear and the drive motor are cooled with the cold environmental air separately and independent from each other. The cold environmental air is aspirated by a ventilator through two suction openings, with the cooling air flowing through two separate air channels over both the gear and the drive motor and with the air being discharged through two exhaust openings. The ventilator is mounted on the drive motor shaft and is located between the drive motor and the gear. One of the channels extends through the gear to one side of the ventilator, and the other of the channels extends through the drive motor to another side of the ventilator. The ventilator is provided, on each of its sides, with a separate blade which is associated with a respective channel.

A serious drawback of the tool disclosed in DE-19 000 339 consists in that the ventilator wheel is arranged between the drive motor and the gear. This results in a time-consuming operation associated with mounting of the wheel and its eventual necessary replacement. A further drawback consists in the high costs of the wheel itself which is made of two parts.

Accordingly an object of the present invention is to provide an electric tool which would be simple to produce and to assembly and which, at the same time, would insure a required cooling of the gear, the drive motor, and other elements of the tool.

SUMMARY OF THE INVENTION

These and other objects of the present invention, which will become apparent hereinafter, are achieved by mounting the ventilator wheel in the end region of the drive motor remote from the gear, with both air channels ending at a side of the wheel adjacent to the drive motor.

Due to the arrangement of the wheel according to the present invention, the wheel is easily accessible during both mounting and dismounting. Because both air channels are only at one side of the wheel, the wheel is formed of a single part. In comparison with an wheel formed of two parts arranged on opposite sides of a ventilator, the wheel according to the present invention, which is formed as single part, is more stable, have a longer service life, and can be economically produced.

Because besides the gear, the hammer mechanism can also be heated, the one air channel is associated, in addition to the gear, with the hammer mechanism, and the cooling air, which flows through the one air channel, in addition to the gear, also cools the hammer mechanism.

Further, the electric tool includes a control electronics for controlling the tool operation and which is arranged, generally, either in the housing or in the handle and the operation of which is adversely influenced by high temperatures. To prevent the adverse influence of high temperature on the operation of the control electronics, it also need be cooled. Advantageously, the second air channel is associated not only with the drive motor but also with the control electronic cooling the same.

In order to insure that the cooling air is aspirated in the region of the hammer mechanism, at least one suction opening of the first channel, which cools the hammer mechanism and the gear, is advantageously provided in the end region of the tool facing in the tool operational direction.

In order to cool the drive motor and the electronics with a cleanest air possible at least one suction opening of the second air channel, which cools the drive motor and the electronics, is advantageously provided in the handle. This suction opening, preferably, faces in a direction opposite to the operational direction and has means which prevents penetration of the dust into the air channel associated with this opening. To prevent the penetration of the drilling dust and drillings, in particular when the tool is used for overhead work, advantageously, the suction openings are formed each of a plurality of slots extending parallel to each other adjacent to each other.

The novel features of the present invention, which are considered as characteristic for the invention, are set forth in particular in the appended claims. The invention itself, however, both as to its construction and its mode of operation, together with additional advantages and objects thereof, will be best understood from the following detailed description of preferred embodiments when read with reference to the accompanying drawings.

BRIEF DESCRIPTION OF THE DRAWINGS

In the drawings:

Single FIGURE shows a simplified view of an electrical tool according to the present invention.

DETAILED DESCRIPTION OF THE PREFERRED EMBODIMENT

An electric tool according to the present invention, which is shown in the drawing, represents a drilling and chiseling tool and includes a housing 1, a handle 2 connected with the housing 1 and formed integrally therewith, and a trigger 14 arranged in the handle 2. The tool further includes a chuck 13, a drive motor 11 and a hammer mechanism 9 which are arranged in the housing 1. A gear 9 is provided between the drive motor 11 and the hammer mechanism 9. The tool also includes a control electronics 12 for controlling the operation of the tool, and an electrical conductor 15 for connecting the tool with an external power source.

In the end region facing in the operational direction of the tool, in the vicinity of the chuck 13, there is provided a first suction opening 5 of a first air channel 3 which extends over the hammer mechanism 9 and the gear 10 to a ventilator wheel 7 which is mounted on a section of a shaft of the drive motor 11 arranged opposite of the gear 10. In the region of the handle 2, there is provided a second suction opening 6 of a second air channel 4, which extends likewise to the wheel 7 over the drive motor 11 and the electronics 13. As the first air channel 3, the second air channel 4 ends at a side of the wheel 7 adjacent to the drive motor 11.

Both air channels 3 and 4 are separated from each other, so that the hammer mechanism 9 and the gear 10 as well as the drive motor 11 and the electronics 12 can be cooled by the surrounding air. The ventilator wheel 7 mixes the air, which flows through the first and second channels 3 and 4, with the air being discharge through at least one exhaust opening and formed in the cover of the housing 1.

Both the first suction opening 5 and the second suction opening 6 are formed each as a plurality of slots arranged adjacent to each other and through which only the cooling surrounding air can pass, without any drillings.

Though the present invention has been shown and described with reference to a preferred embodiment, such is merely illustrative of the present invention and is not to be construed as to be limited to the disclosed embodiment and/or details thereof, and the present invention includes all modifications, variations and/or alternate embodiments within the spirit and scope of the present invention as defined by the appended claims.

What is claimed is:

1. An electric tool, comprising a hammer mechanism (9); a drive motor (11) for driving the hammer mechanism (9); a gear (10) for connecting the drive motor (11) with the hammer mechanism (9); a ventilator wheel (7) provided in an end region of the drive motor (11) remote from the gear (10) and connected with an exhaust opening (8); and separate air channels (3,4) having each a suction opening (5,6) and ending at a side of the wheel 7 adjacent to the drive motor (11), one of the air channels (3) being associated at least with the gear (10), and another of the air channels (4) being associated at least with the drive motor (11).

2. An electric tool according to claim 1, wherein the one of the air channels (3) is associated, in addition to being associated with the gear (10), with the hammer mechanism (9).

3. An electric tool according to claim 1, wherein the another of the air channels (4) is associated, in addition to being associated with the drive motor (11), with a control electronics (12).

4. An electric tool according to claim 1, wherein the suction opening (5) of the one of the air channels (3) is arranged in an end region of the electric tool facing in an operational direction of the tool.

5. An electric tool according to claim 1, wherein the suction opening (6) of the another of the air channels (4) is provided in a region of a tool handle.

6. An electric tool according to claim 1, wherein each of the suction openings (5,6) of each of the air channels (3,4) is formed as a plurality of slots extending parallel to each other adjacent to each other.

* * * * *